(12) United States Patent
Chen et al.

(10) Patent No.: US 9,001,003 B2
(45) Date of Patent: Apr. 7, 2015

(54) HANDHELD DEVICE

(75) Inventors: Chien-Chih Chen, Taoyuan (TW);
Chun-Wei Tseng, Taoyuan (TW);
Yen-Liang Kuo, Taoyuan (TW);
Wan-Ming Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 868 days.

(21) Appl. No.: 13/041,858

(22) Filed: Mar. 7, 2011

(65) Prior Publication Data

US 2012/0229346 A1   Sep. 13, 2012

(51) Int. Cl.
*H01Q 3/24* (2006.01)
*H01Q 1/24* (2006.01)
*H01Q 5/00* (2006.01)
*H01Q 9/42* (2006.01)
*H04B 1/00* (2006.01)
*H04W 88/02* (2009.01)

(52) U.S. Cl.
CPC ............. *H01Q 1/243* (2013.01); *H01Q 5/0055* (2013.01); *H01Q 9/42* (2013.01); *H04B 1/006* (2013.01); *H04W 88/02* (2013.01)

(58) Field of Classification Search
CPC ...... H01Q 5/0055; H01Q 9/42; H01Q 9/0421
USPC ................................................. 343/702, 876
See application file for complete search history.

(56) References Cited

U.S. PATENT DOCUMENTS

| 8,098,204 | B2 | 1/2012 | Tsujimura et al. | |
| 2009/0058735 | A1* | 3/2009 | Hill et al. | 343/702 |
| 2010/0033397 | A1* | 2/2010 | Narasimhan et al. | 343/860 |

FOREIGN PATENT DOCUMENTS

| JP | 8-321716 | 12/1996 |
| JP | 2006-165834 | 6/2006 |
| JP | 2007-288360 | 11/2007 |

OTHER PUBLICATIONS

Office Action from corresponding Japanese Appln. No. 2011-116319 dated Sep. 10, 2013. English summary translation attached.
Office Action from corresponding Korean Appln. No. 10-2011-0134190 dated Sep. 24, 2013. English summary translation attached.
Office Action from corresponding Japanese Appln. No. 2011-116319 dated Mar. 5, 2013. English summary translation attached.
Office Action from corresponding Korean Appln. No. 10-2011-0134190 dated Mar. 19, 2013. English translation attached.

* cited by examiner

*Primary Examiner* — Robert Karacsony
(74) *Attorney, Agent, or Firm* — Grossman, Tucker, Perreault & Pfleger, PLLC

(57) ABSTRACT

A handheld device is provided, wherein the handheld device comprises a housing, a circuit board, a planar antenna and a switch. The housing comprising an outer surface is configured to define a receiving space. The circuit board is disposed in the receiving space. The planar antenna comprises a metal layer, wherein the metal layer comprising a first connecting point and a second connecting point is patterned on the outer surface. The switch comprising a first electrode and a second electrode is configured to control the electrical connection between the first connecting point and the second connecting point, wherein the first electrode and the second electrode are electrically connected between the first connecting point and the second connecting point. The planar antenna operates at a first central band when the switch is turned on, and operates at a second central band when the switch is turned off.

2 Claims, 7 Drawing Sheets

HANDHELD DEVICE

REPRESENTATIVE FIGURE (i) Representative Figure: FIG. 1
(ii) Brief Description of Reference Numerals of the Representative Figure:
1: handheld device
11: housing
111: receiving space
113: outer surface
13: circuit board
131: grounding terminal
133: radio frequency signal terminal
15: planar antenna
151: metal layer
1511: first connecting point
1512: second connecting point
151a: grounding connector
151b: feeding connector
17: switch
171: first electrode
172: second electrode

CHEMICAL FORMULA BEST CHARACTERIZING THE INVENTION

None

DESCRIPTION OF THE INVENTION

1. Field of the Invention

The subject application relates to a handheld device. More particularly, a planar antenna of the handheld device of the subject application comprises a switch so that, by adaptively turning on or off the switch, the planar antenna can operate at two central frequency bands.

2. Descriptions of the Related Art

Thanks to development of the communication industry, people can now communicate with or transmit data to each other through wireless transmissions. In recent years, as several kinds of wireless communication systems have been proposed and put into practice successively, most of mobile phones available in the market are able to support communications via two or more kinds of wireless communication systems. For example, mobile phones available in the market are generally able to support communications via 2G and 3G wireless communication systems, i.e., the Global System for Mobile Communication (GSM) and the Universal Mobile Telecommunications System (UMTS). In additional to the 2G and 3G wireless communication systems, many smart mobile phones also support packet transmissions via the Wireless LAN (WLAN) system and the 3GPP Long Term Evolution (3GPP LTE) system, and are further able to receive audio and video (AV) signals via the Digital Video Broadcasting (DVB) system or accomplish a positioning purpose via the Global Positioning System (GPS).

Different wireless communication systems usually transmit signals by use of different frequency bands. Therefore, to allow for a mobile phone to operate in different frequency bands, mobile phone manufacturers generally have multiple antennas installed in the mobile phone so that the mobile phone can operate in different corresponding central frequency bands. Planar inverted-F antennas (PIFAs) are commonly used as antennas in mobile phones because of their light weight and thin profiles. A conventional single-frequency band PIFA only has a radiator of about a quarter wavelength as a current path for resonance, and if the single-frequency band PIFA is desired to operate in more central frequency bands, then other parasitic antenna elements and/or other branches must be added to form more current paths.

Furthermore, to operate in different central frequency bands, the conventional single-frequency band PIFA will, due to the increased number of antenna elements, suffer from an unexpected coupling effect between the antenna elements, which may lead to increased complexity in the antenna design. Also due to the increased number of antenna elements, the antenna is made to have a bulky volume, thereby giving rise to a lot of unfavorable factors. On the other hand, the conventional single-frequency band PIFA is also unable to operate in multiple central frequency bands through switching operations.

Accordingly, it is highly desirable in the art to design a planar antenna that has a small volume and a simple design and can adaptively operate in different central frequency bands.

CONTENTS OF THE INVENTION

An objective of the subject application is to provide a handheld device, which has a small volume and a simple design and can adaptively operate at two different central frequency bands. Because a planar antenna of the subject application only has a metal layer patterned on a housing of the handheld device as a radiator, the planar antenna will have a reduced volume as compared to that of the conventional single-frequency band PIFA antenna. Furthermore, because the planar antenna of the subject application is able to operate at two central frequency bands without need of other additional parasitic antenna elements and/or other branches, complexity in design of the planar antenna is also reduced.

To achieve the aforesaid objective, the subject application discloses a handheld device, which comprises a housing, a circuit board, a planar antenna and a switch. The housing has an outer surface and defines a receiving space for receiving the circuit board therein. The planar antenna comprises a metal layer, which is patterned on the outer surface for use as a radiator. The metal layer comprises a first connecting point and a second connecting point. The switch comprises a first electrode and a second electrode that are electrically connected between the first connecting point and the second connecting point of the metal layer to control the electrical connection between the first connecting point and the second connecting point. The planar antenna operates at a first central frequency band when the switch is turned on, and operates at a second central frequency band when the switch is turned off.

The detailed technology and preferred embodiments implemented for the subject application are described in the following paragraphs accompanying the appended drawings for people skilled in this field to well appreciate the features of the claimed invention.

DESCRIPTION OF THE PREFERRED EMBODIMENT

The subject application primarily relates to a handheld device comprising a planar antenna and a switch. The switch can be adaptively turned on or off to allow the planar antenna to operate at least two central frequency bands. It shall be appreciated that, descriptions of the following embodiments are only for purpose to illustrate but not to limit the subject application. Furthermore, in the following embodiments and the attached drawings, elements unrelated to the subject application are omitted from depiction; and dimensional relationships among individual elements in the attached drawings are illustrated only for ease of understanding, but not to limit the actual scale.

FIG. 1 depicts a handheld device 1 according to a first embodiment of the present invention. The handheld device 1 may be a mobile phone, a notebook computer, a tablet computer, a wireless router or some other device that needs to operate at multiple frequency bands. The handheld device 1 comprises a housing 11, a circuit board 13, a planar antenna 15 and a switch 17. It shall be noted that, for purpose of simplicity of the description, other components of the handheld device 1 such as the display module, the communication module, the input module, the power supply module and other components less related to the subject application will be omitted from depiction herein. Furthermore, the planar antenna 15 of the subject application may also be applied to various communication systems, e.g., the Code Division Multiple Access (CDMA) system, the 3GPP Long Term Evolution (LTE) system, the Global System for Mobile Communication (GSM), the Digital Communication System (DCS), the Personal Communications Services (PCS) system, the Universal Mobile Telecommunications System (UMTS), the Digital Video Broadcasting (DVB) system, the Global Positioning System (GPS) and the Worldwide Interoperability for Microwave Access (WiMAX) system.

Further speaking, the housing 11 defines a receiving space 111 and has an inner surface 112 (not shown) and an outer surface 113. The circuit board 13 is disposed within the receiving space 111. It shall be appreciated that, the receiving space 111 described herein refers to an interior space enclosed by the housing 11, the outer surface 113 may be any surface layer of the housing 11 that is exposed outside, and the inner surface 112 may be any surface layer of the housing that is opposite to the outer surface 113 and hidden inside the housing 11. The planar antenna 15 comprises a metal layer 151, which is patterned (coated) on the outer surface 113 for use as a radiator. The metal layer 151 further comprises a first connecting point 1511 and a second connecting point 1512. For purpose of simplicity, an embodiment in which the planar antenna 15 is disposed on the outer surface 113 will be described hereinafter, although the subject application is not limited thereto. Those skilled in the art may also dispose the planar antenna 15 on the inner surface 112 of the housing 11, or even has the planar antenna 15 embedded into the housing 11 through, for example, injection molding. However, to obtain an optimal performance to the handheld device, it is preferred that the planar antenna 15 is disposed on the outer surface 113.

The metal layer 151 may be patterned (coated) on the outer surface 113 through a co-injection molding process or a laser direct structuring (LDS) process; however, the subject application is not limited to these two processes, and any process that can pattern (coat) the metal layer 151 on the outer surface 113 shall fall within the scope of the subject application. The metal layer 151 functions as a radiator to form a resonant current path and to generate electromagnetic radiation. The term "patterning" used in this embodiment refers to forming a metal layer 151 of a specific pattern on the outer surface 113, and the specific pattern generally refers to a profile that can make the planar antenna 15 to radiate electromagnetic waves; in other words, the conventional PIFA profile and any profile designed based on the conventional PIFA profile all fall within the scope of the subject application.

In detail, the metal layer 151 comprises a grounding connector 151a and a feeding connector 151b. The first connecting point 1511 is coupled to a grounding terminal 131 of the circuit board 13 via the grounding connector 151a, and the second connecting point 1512 is coupled to a radio frequency (RF) signal terminal 133 of the circuit board 13 via the feeding connector 151b. The metal layer 151 is implemented in a way similar to a PIFA, and comprises an endpoint 1518 of the current path. The circuit board 13 may be considered as a system ground plane of the whole handheld device 1. The switch 17, which is disposed on the circuit board 13, comprises a first electrode 171 and a second electrode 172. The first electrode 171 is coupled to the first connecting point 1511 via the grounding connector 151a, and the second electrode 172 is coupled to the second connecting point 1512 via the feeding connector 151b; that is, the first electrode 171 and the second electrode 172 are electrically connected between the first connecting point 1511 and the second connecting point 1512. Thus, by turning off or turning on the switch 17, the electrical connection between the first connecting point 1511 and the second connecting point 1512 can be controlled.

Furthermore, the on/off state of the switch 17 is important. For an example, when the switch 17 is turned on, the planar antenna 15 can operate at a first central frequency band, and the switch 17, the first electrode 171 and the second electrode 172 form part of the radiator of the planar antenna 15 to serve the same radiation function as the metal layer 151. In other words, the metal layer 151, the switch 17, the first electrode 171 and the second electrode 172 may all be considered as part of the current path of the planar antenna 15. Therefore, when the switch 17 is turned on, the current path substantially comprises at least two parts: the first part extends from the grounding terminal 131 through the grounding connector 151a to the first connecting point 1511 and then to the endpoint 1518; and the second part extends also from the grounding terminal 131 through the first electrode 171, the switch 17, the second electrode 172, the feeding connector 151b to the second connecting point 1512 and then to the endpoint 1518. Hence, the current path is a sum of the two parts.

When the switch 17 is turned off, the planar antenna 15 can operate at a second central frequency band. In this case, the current path is only from the grounding terminal 131 through the grounding connector 151a to the first connecting point 1511 and then to the endpoint 1518. As can be known from the above description, the current path of the planar antenna 15 when the switch 17 is turned on is longer than that when the switch 17 is turned off. In other words, a frequency at which the planar antenna 15 operates at the first central frequency band is lower that a frequency at which the planar antenna 15 operates at the second central frequency band.

Specifically, turning on or turning off of the switch 17 will lead to a change in the current path of the metal layer 151 so that the planar antenna 15 can selectively operate at the first central frequency band and/or the second central frequency band. Here, the first central frequency band and the second central frequency band are different from each other. It shall be appreciated that, the switch 17 may be a mechanical switch, an electronic switch or any component that can be used to control the electrical connection between the first connecting point 1511 and the second connecting point 1512. Furthermore, the positions of the grounding terminal 131 and the RF signal terminal 133 on the circuit board 13 in this embodiment are only illustrated as an example of the handheld device 1 of the present invention, and in other embodiments, the positions of the grounding terminal 131 and the RF signal terminal 133 on the circuit board 13 may be swapped with each other. In addition, the "connector" described in this embodiment is a conductor, which may be a metal spring extending directly from the metal layer 151, a metal pin, a spring or a pogo pin separate from the metal layer, or any conductor that can be used to electrically connect a connecting point of the metal layer 151 to the circuit board 13.

A handheld device 2 of the second embodiment is shown in FIG. 2. It shall be appreciated that, in this embodiment, elements identical to those of the first embodiment will be designated by the same reference numerals, and unless otherwise stated in this embodiment, the manufacturing processes, properties and connections of these elements are all the same as those of the first embodiment. In other words, these elements may be equivalent to those bearing the same reference numerals in the first embodiment, so they will not be further described herein.

Specifically, the second embodiment differs from the first embodiment in that, the handheld device 2 of the second embodiment further comprises a direct current (DC) blocking element 18 and an RF blocking element 19 disposed on the circuit board 13, and the switch 17 is a diode element 17*a*. The second diode 172 of the diode element 17*a* is coupled to the second connecting point 1512 via the DC blocking element 18 and the feeding connector 151*b*, and the first electrode 171 of the diode element 17*a* is coupled to the first connecting point 1511 via the grounding connector 151*a*. Furthermore, the second electrode 172 of the diode element 17*a* is further coupled via the RF blocking element 19 to a DC signal terminal 135 of the circuit board 13 to receive a DC signal. The DC signal is configured to control whether to turn on or turn off the diode element 17*a*.

It shall be appreciated that, the DC blocking element 18 electrically connected between the second electrode 172 of the diode element 17*a* and the RF signal terminal 133 of the circuit board 13 is used to block flow of the DC control signal to the RF signal terminal 133 of the circuit board 13. The DC blocking element 18 may be a capacitive element or any element or combination of elements that can block flow of DC signals. Additionally, the RF blocking element 19 electrically connected between the second electrode 172 of the diode element 17*a* and the DC signal terminal 135 of the circuit board 13 is used to block flow of an RF signal to the circuit board 13. The RF blocking element 19 may be a combination of a capacitive element and an inductive element, or any single element or combination of elements that can block flow of RF signals.

Further speaking, when the diode element 17*a* is turned on, the planar antenna 15 operates at a first central frequency band, and when the diode element 17*a* is turned off, the planar antenna 15 operates at a second central frequency band. In other words, by turning on or off the diode element 17*a*, two kinds of resonant current paths can be formed on the metal layer 151; therefore, by turning on or off the diode element 17*a*, the planar antenna 15 can selectively operate at the first central frequency band and/or the second central frequency band. Similarly, the current path of the planar antenna 15 when the diode element 17*a* is turned on is longer than that when the diode element 17*a* is turned off. In other words, a frequency at which the planar antenna 15 operates at the first central frequency band is lower that a frequency at which the planar antenna 15 operates at the second central frequency band.

A handheld device 3 of a third embodiment of the present invention is as shown in FIG. 3. Different from the second embodiment, the metal layer 151 of the handheld device 3 of the third embodiment is patterned (coated) into two blocks, and further comprises a third connecting point 1513 and a first connector 151*c*. The first connecting point 1511 is coupled to the grounding terminal 131 of the circuit board 13 via the grounding connector 151*a*, and the second connecting point 1512 is electrically connected to the RF signal terminal 133 of the circuit board 13 via the feeding connector 151*b*. Furthermore, the handheld device 3 further comprises a DC blocking element 18 and an RF blocking element 19 disposed on the circuit board 13. The DC blocking element 18 is electrically connected between the first connecting point 1511 and the second connecting point 1512 via the grounding connector 151*a* and the feeding connector 151*b*.

Similarly, in the third embodiment, the switch 17 is also a diode element 17*a*. The first electrode 171 of the diode element 17*a* is electrically connected to the first connecting point 1511 of the metal layer 151 via the grounding connector 151*a*, and the second electrode 172 of the diode element 17*a* is electrically connected to the third connecting point 1513 of the metal layer 151 via the first connector 151*c*. The third connecting point 1513 is further electrically connected via the second connecting point 1512, the feeding connector 151*b* and the RF blocking element 19 to a DC signal terminal 135 of the circuit board 13 to receive a DC signal. The DC signal is transmitted through the first connector 151*c* to the diode element 17*a* along the path described above, and is configured to control whether to turn on or turn off the diode element 17*a*.

A handheld device 4 of a fourth embodiment of the present invention is as shown in FIG. 4. Different from the second embodiment, the metal layer 151 of the handheld device 4 of the fourth embodiment is patterned (coated) into two blocks, and further comprises a third connecting point 1513, a fourth connecting point 1514, a first connector 151*c* and a second connector 151*d*. The second connecting point 1512 is electrically connected to the RF signal terminal 133 of the circuit board 13 via the feeding connector 151*b*, and the fourth connecting point 1514 is electrically connected to the grounding terminal 131 of the circuit board 13 via the grounding connector 151*a*. Similarly, the handheld device 4 comprises a DC blocking element 18 and an RF blocking element 19 disposed on the circuit board 13. The DC blocking element 18 is electrically connected between the first connecting point 1511 and the second connecting point 1512 via the first connector 151*c* and the feeding connector 151*b*.

Also, the switch 17 is a diode element 17*a*. The first electrode 171 of the diode element 17*a* is electrically connected to the first connecting point 1511 of the metal layer 151 via the first connector 151*c*, and the second electrode 172 of the diode element 17*a* is electrically connected to the third connecting point 1513 of the metal layer 151 via the second connector 151*d*. The third connecting point 1513 is further coupled via the second connecting point 1512, the feeding connector 151*b* and the RF blocking element 19 to a DC signal terminal 135 of the circuit board 13 to receive a DC signal. The DC signal is transmitted through the second connector 151*d* to the diode element 17*a* along the path described above, and is configured to control whether to turn on or turn off the diode element 17*a*.

A handheld device 5 of a fifth embodiment of the present invention is as shown in FIG. 5. Different from the second embodiment, the metal layer 151 of the handheld device 5 of the fifth embodiment is patterned (coated) into two blocks, and further comprises a third connecting point 1513, a fourth connecting point 1514, a fifth connecting point 1515, a sixth connecting point 1516, a first connector 151*c*, a second connector 151*d*, a third connector 151*e*, and a fourth connector 151*f*. The second connecting point 1512 is electrically connected to the RF signal terminal 133 of the circuit board 13 via the feeding connector 151*b*, and the fourth connecting point 1514 is electrically connected to the grounding terminal 131 of the circuit board 13 via the grounding connector 151*a*. Furthermore, the handheld device 5 further comprises a DC blocking element 18 and an RF blocking element 19 disposed on the circuit board 13. The DC blocking element 18 is coupled between the fifth connecting point 1515 and the sixth connecting point 1516 via the third connector 151e and the fourth connector 151f.

Also, the switch 17 is a diode element 17a. The first electrode 171 of the diode element 17a is electrically connected to the first connecting point 1511 of the metal layer 151 via the first connector 151c, and the second electrode 172 of the diode element 17a is electrically connected to the third connecting point 1513 of the metal layer 151 via the second connector 151d. The third connecting point 1513 is further electrically connected via the second connecting point 1512, the feeding connector 151b and the RF blocking element 19 to a DC signal terminal 135 of the circuit board 13 to receive a DC signal. The DC signal is transmitted through the second connector 151d to the diode element 17a along the path described above, and is configured to control whether to turn on or turn off the diode element 17a.

A handheld device 6 of a sixth embodiment of the present invention is as shown in FIG. 6. Different from the second embodiment, the handheld device 6 of the sixth embodiment further comprises an auxiliary metal layer 151' extending from the second connecting point 1512 towards an edge of the outer surface 113 and then extending gradually along the edge, and comprises an endpoint 1517 of the current path. In other words, the auxiliary metal layer 151' is electrically connected to the metal layer 151 and the second connecting point 1512, and extends over the outer surface 113. Because the whole current path framework can be changed through addition of the auxiliary metal layer 151', the planar antenna 15 of the sixth embodiment is able to, within a central frequency band, operate in a dual-band mode, i.e., in a high-frequency current path and a low-frequency current path simultaneously. For convenience of describing the technical features of the present invention, the length/width of both the metal layer and the auxiliary metal layer are schematically drawn, and those skilled in the art can arbitrarily adjust the pattern profile and range within the spirits of the present invention.

Further speaking, when the diode element 17a is turned on, the planar antenna 15 can operate at a first central frequency band, which comprises a first low-frequency current path and a first high-frequency current path. The first low-frequency current path substantially comprises at least two parts: the first part extends from the grounding terminal 131 through the grounding connector 151a to the first connecting point 1511 and then to the endpoint 1518; and the second part extends also from the grounding terminal 131 through the first electrode 171, the diode element 17a, the second electrode 172, the feeding connector 151b to the second connecting point 1512 and then to the endpoint 1518. Hence, the first low-frequency current path is a sum of the two parts. The first high-frequency current path substantially comprises at least two parts: the first part extends from the grounding terminal 131 through the grounding connector 151a to the first connecting point 1511 and then through the second connecting point 1512 to the endpoint 1517; and the second part extends also from the grounding terminal 131 through the first electrode 171, the switch 17, the second electrode 172, the feeding connector 151b to the second connecting point 1512 and then to the endpoint 1517. Hence, the first high-frequency current path is a sum of the two parts. Obviously, when the diode element 17a is turned on, a dual-band operating mode of the planar antenna 15 can be achieved.

When the switch 17 is turned off, the planar antenna 15 can operate at a second central frequency band, which comprises a second low-frequency current path and a second high-frequency current path. The second low-frequency current path only extends from the grounding terminal 131 through the grounding connector 151a to the first connecting point 1511 and then to the endpoint 1518. The second high-frequency current path extends also from the grounding terminal 131 through the grounding connector 151a to the first connecting point 1511 and then through the second connecting point 1512 to the endpoint 1517. Similarly, when the diode element 17a is turned off, a dual-band operating mode of the planar antenna 15 can be achieved. Accordingly, the handheld device 6 of the sixth embodiment has four operating-frequency modes in total.

For example, FIG. 7 is a schematic view illustrating a voltage standing wave ratio (VSWR) of the handheld device 6 according to the sixth embodiment of the present invention when operating at different frequency bands. As shown in FIG. 7, when the switch is turned on, the planar antenna 15 of the handheld device 6 can operate at a first central frequency band, which has a low-frequency current path (that can operate at a fundamental frequency f1 of the LTE system) and a high-frequency current path (that can operate at a harmonic frequency f2 of the LET system). When the switch is turned off, the planar antenna 15 of the handheld device 6 can operate in a second central frequency band, which has a low-frequency current path (that can operate at a fundamental frequency f3 of the CDMA system) and two high-frequency current paths (that can operate at harmonic frequencies f4 and f5 of the CDMA system).

Therefore, a dual-band operation at a low-frequency (i.e., the fundamental frequency) current path and at least one high-frequency (i.e., harmonic frequencies) current path can be achieved within the first central frequency band and the second frequency band respectively. It shall be appreciated that, the first central frequency band shown in FIG. 7 is, for example, an LTE frequency band and the second central frequency band is, for example, a CDMA850 frequency band, although they are not merely limited thereto. Thus, the sixth embodiment of the present invention can not only adaptively switch the planar antenna to different central frequency bands depending on different design requirements and the environment, but also operate at least a dual-band operating mode in the respective frequency bands. This remarkably improves the performance of the planar antenna and convenience in use of the handheld device.

According to the above descriptions, in the subject application, a switch is provided to change the current paths of the planar antenna. The switch can be implemented by a diode element, and a DC signal is used to control whether to turn on or off the diode element.

Furthermore, the subject application implements the metal layer (i.e., the radiator) of the planar antenna formed on a surface of the housing of the handheld device, and makes the diode element, the DC blocking element and the RF blocking element disposed on the circuit board and electrically connected to the metal layer of the planar antenna via connectors. In this way, influences of the electronic components of the circuit board to the characteristics of the planar antenna is avoided; otherwise, if the electronic components are disposed on the planar antenna to be exposed outside, the appearance of the handheld device as a whole will be seriously compromised and these electronic components would be more liable to damage by external forces or to influences from people's contact, making it impossible for them to be protected and to function properly. Thereby, the planar antenna of the handheld device of the subject application features a small volume and a simple design and can adaptively operate at two central frequency bands. More importantly, the planar antenna is more flexible in design, and the planar antenna can be patterned (coated) on the housing regardless of the outline and shape of the housing; meanwhile, instead of having to be disposed on the circuit board or a carrier inside the handheld device as being constrained by the electronic components, the antenna can be made to have an increased height to gain a better performance.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Figure 1:
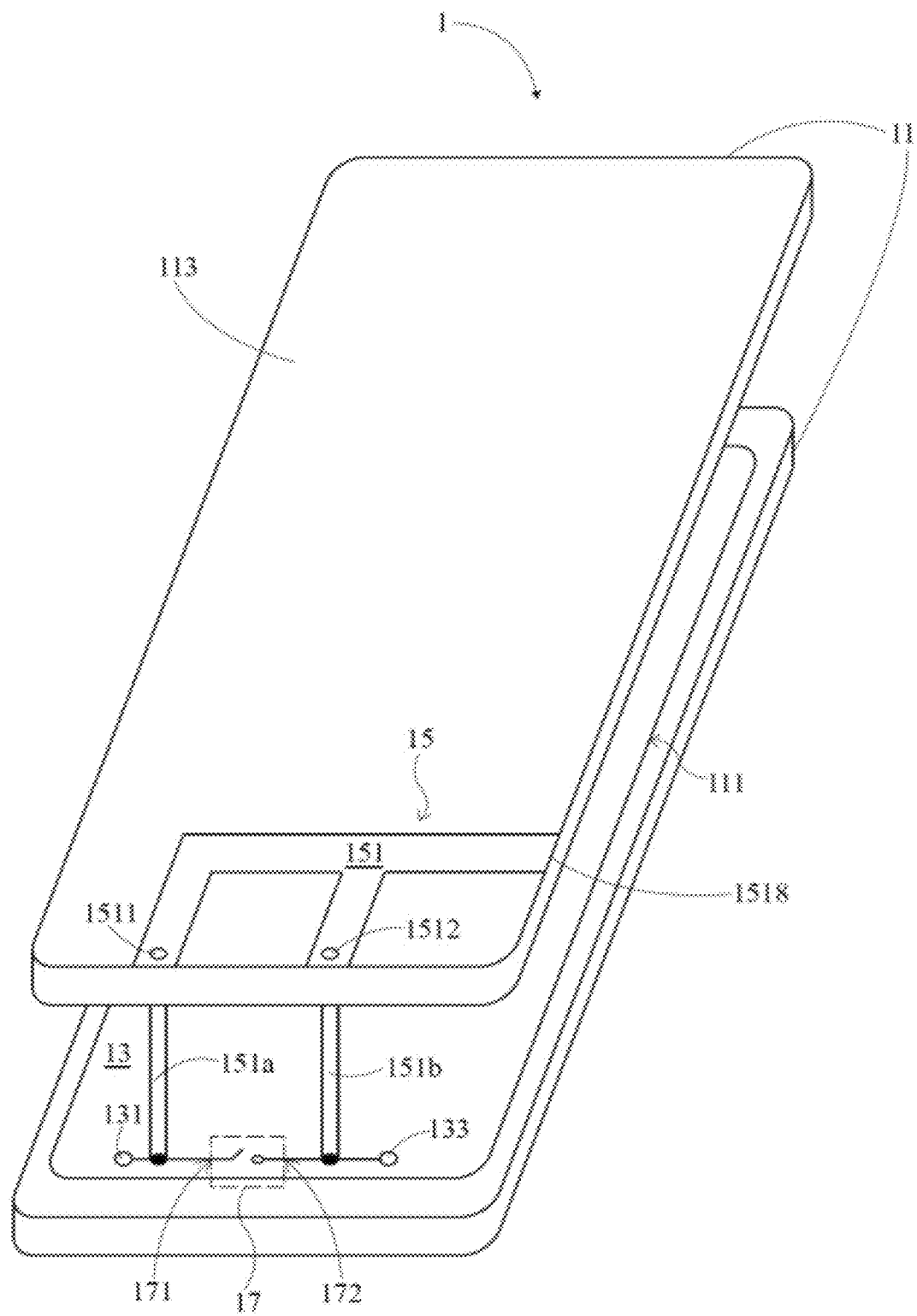
FIG. 1 is a schematic view of a handheld device 1 according to a first embodiment of the present invention.
Figure 2:
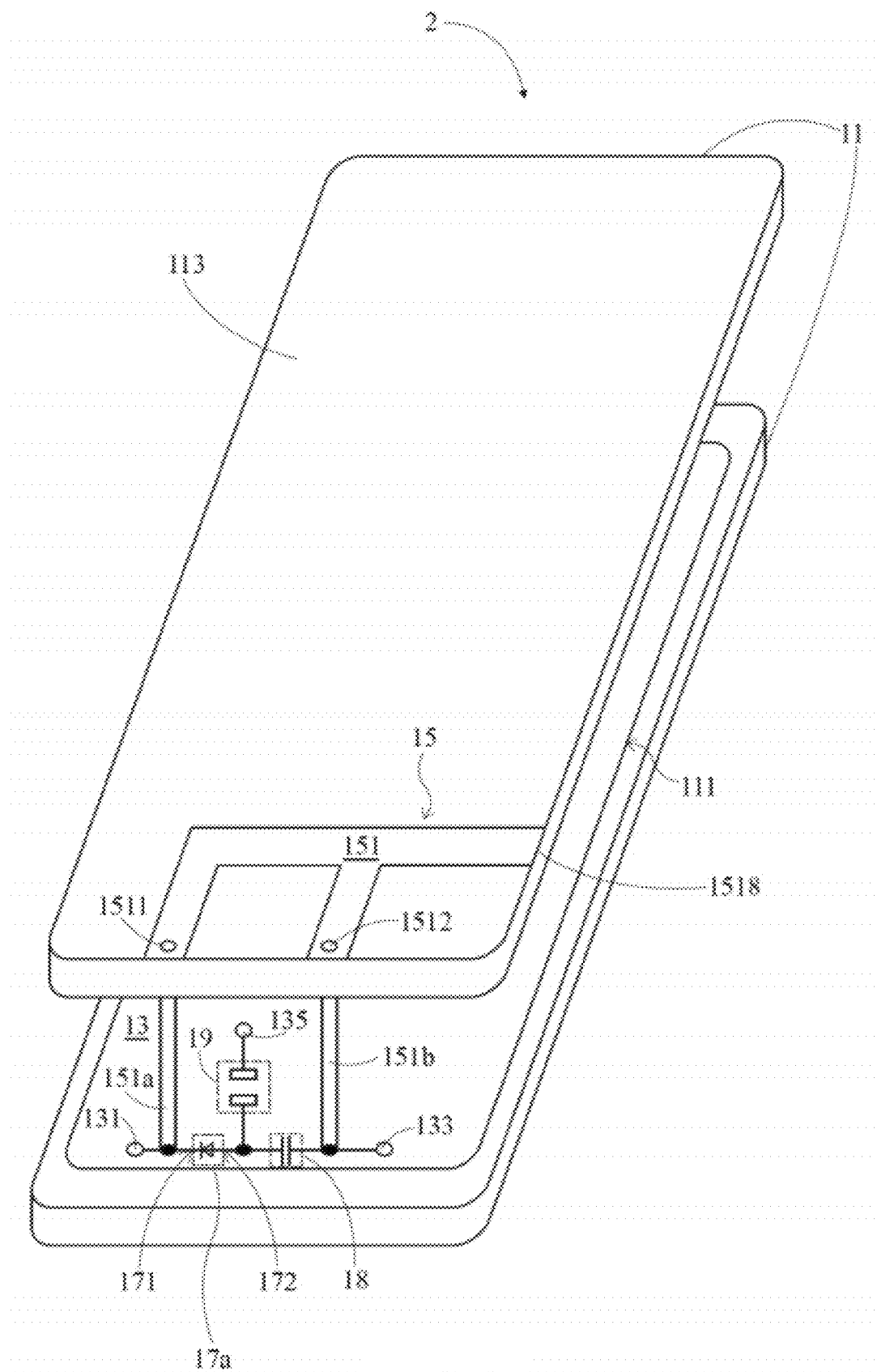
FIG. 2 is a schematic view of a handheld device 2 according to a second embodiment of the present invention.
Figure 3:
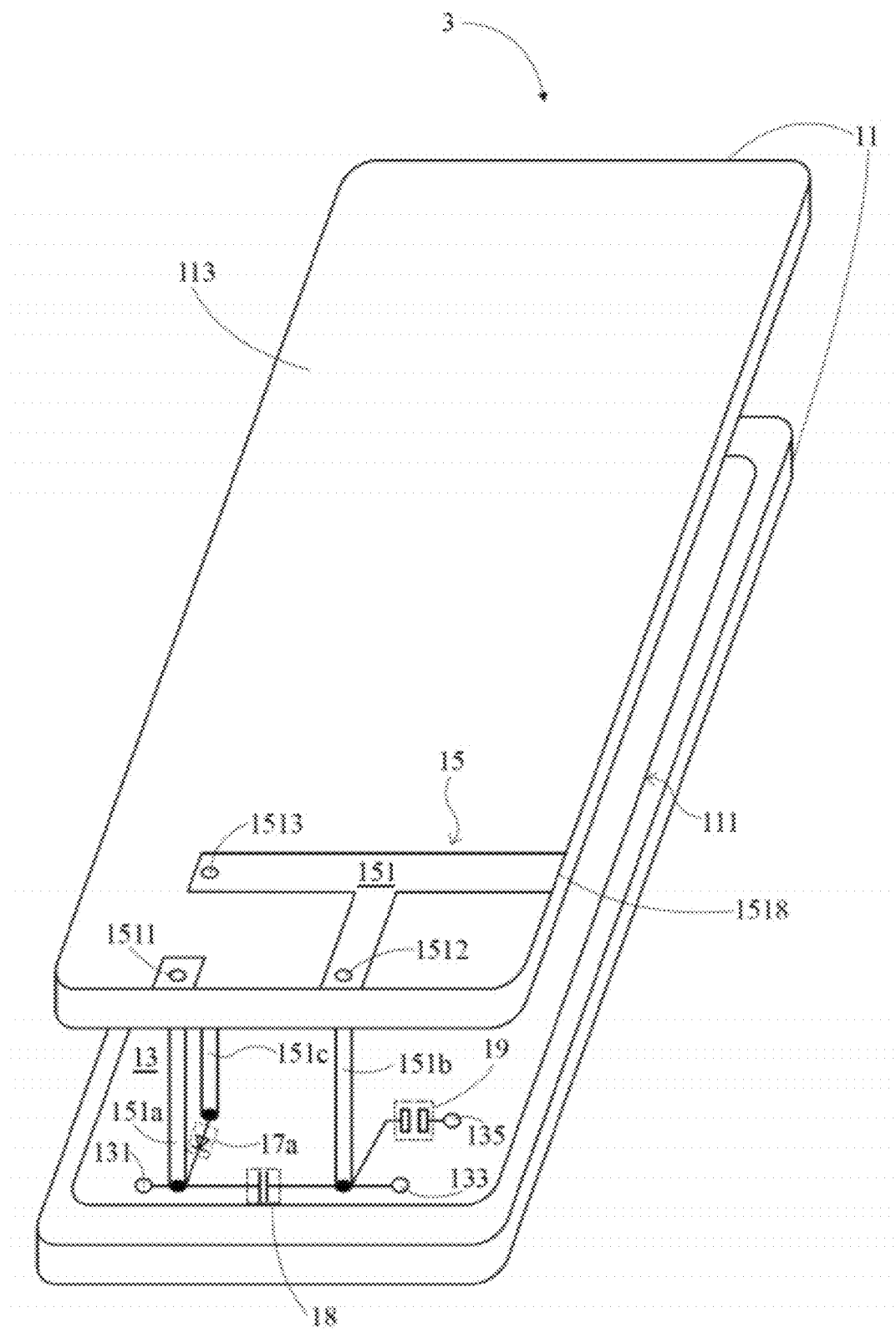
FIG. 3 is a schematic view of a handheld device 3 according to a third embodiment of the present invention.
Figure 4:
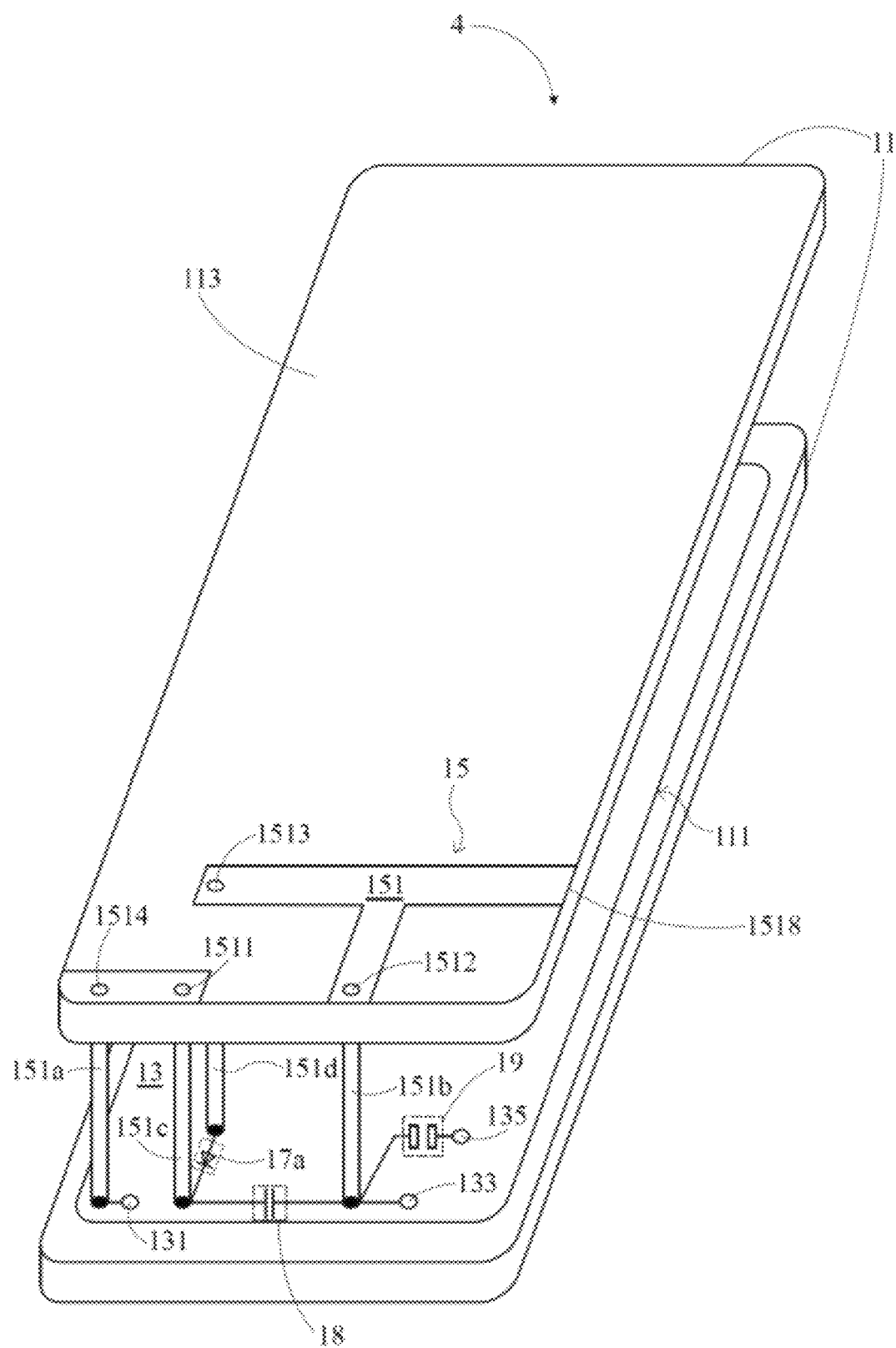
FIG. 4 is a schematic view of a handheld device 4 according to a fourth embodiment of the present invention.
Figure 5:
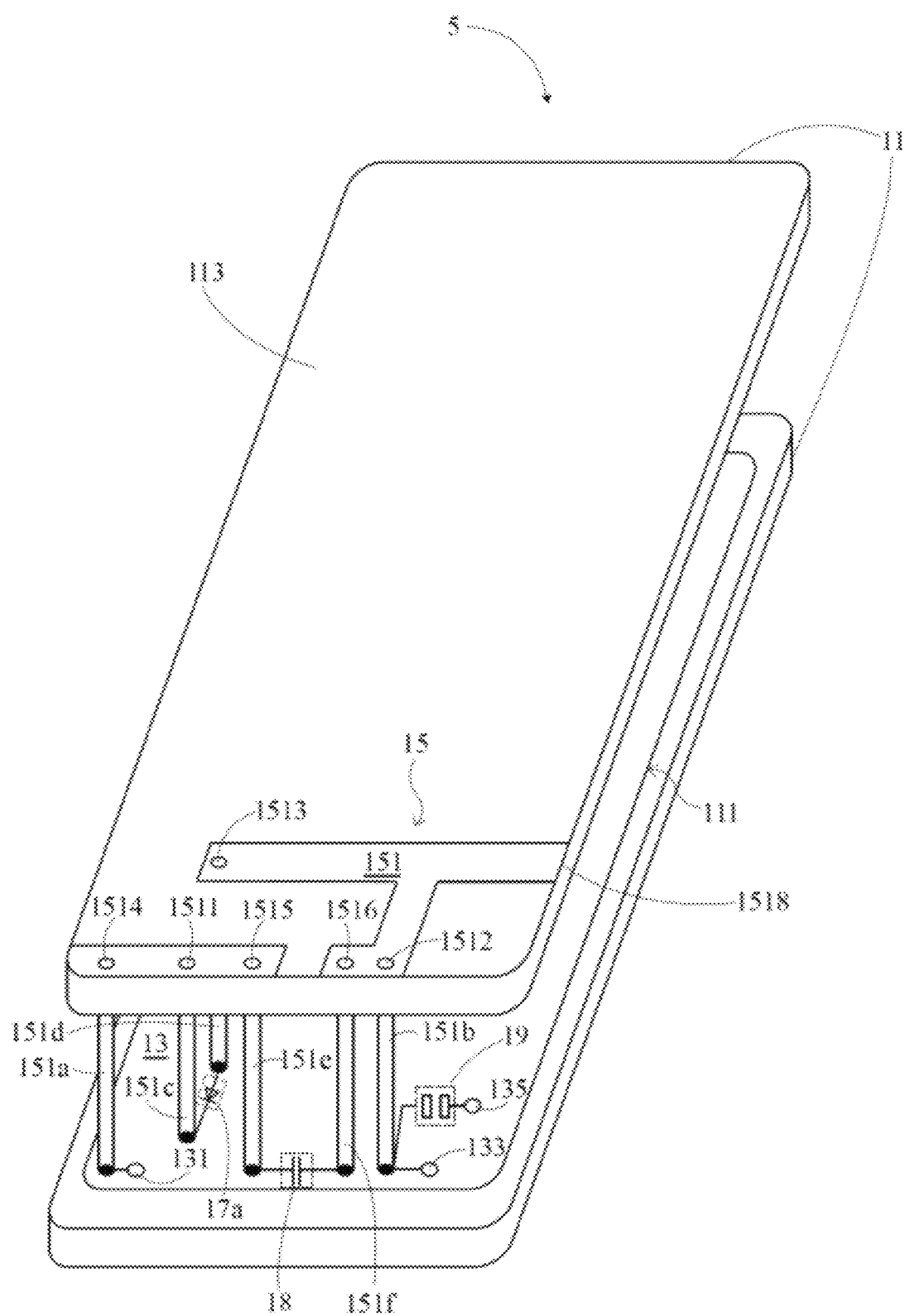
FIG. 5 is a schematic view of a handheld device 5 according to a fifth embodiment of the present invention.
Figure 6:
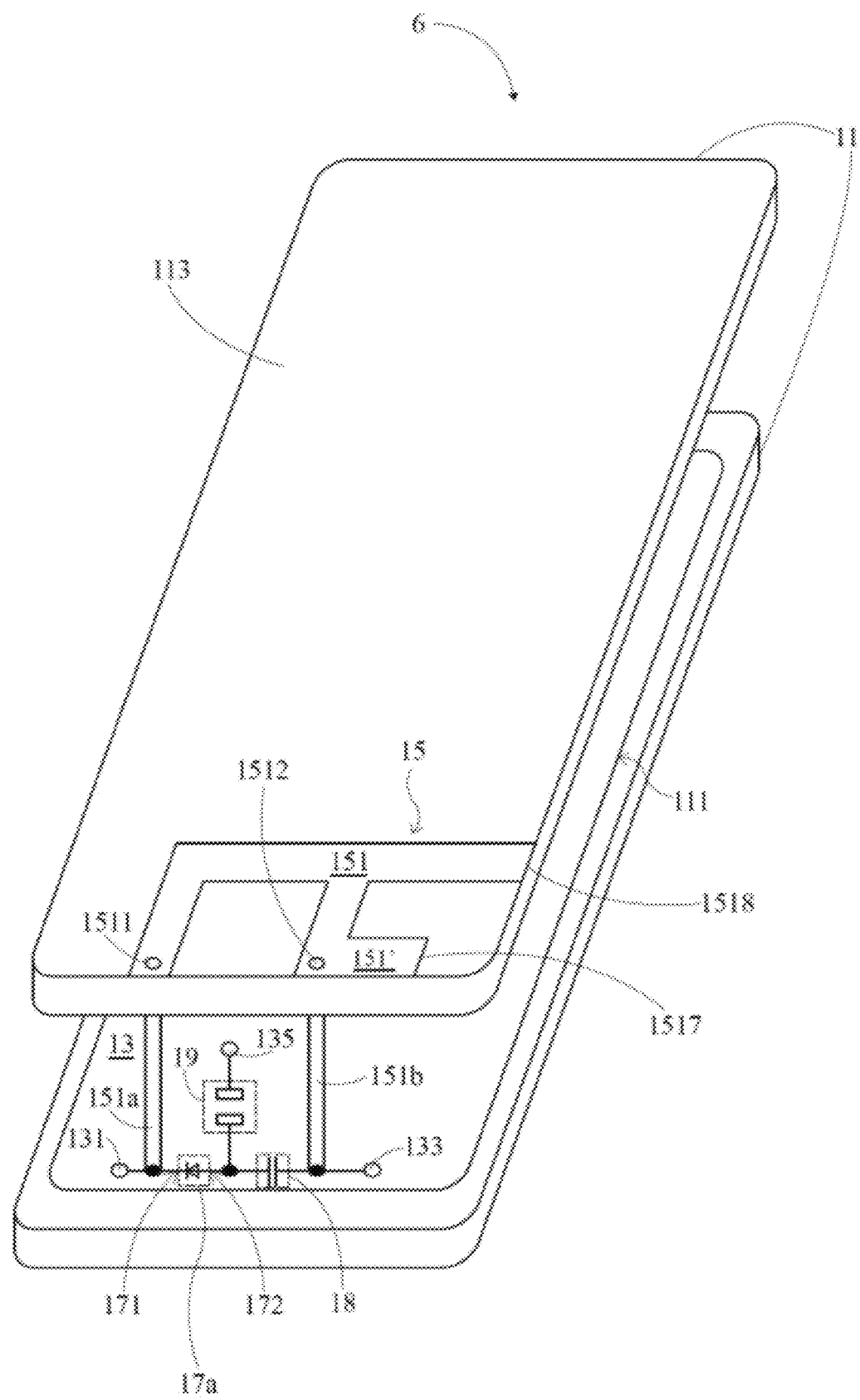
FIG. 6 is a schematic view of a handheld device 6 according to a sixth embodiment of the present invention.
Figure 7:
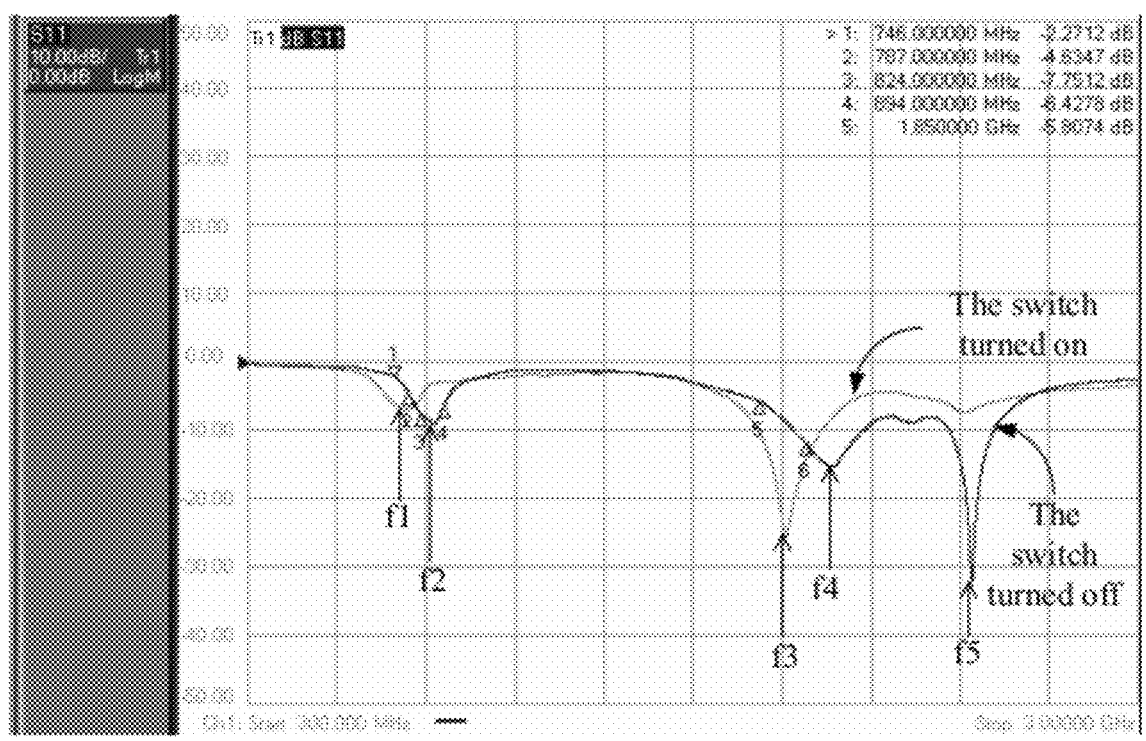
FIG. 7 is a schematic view illustrating a voltage standing wave ratio (VSWR) of the handheld device 6 according to the sixth embodiment of the present invention when operating in different frequency bands.

[Brief Description of Reference Numerals]
1: handheld device
11: housing
111: receiving space
113: outer surface
13: circuit board
131: grounding terminal
133: radio frequency signal terminal
135: direct current signal terminal
15: planar antenna
151: metal layer
151': auxiliary metal layer
1511: first connecting point
1512: second connecting point
1513: third connecting point
1514: fourth connecting point
1515: fifth connecting point
1516: sixth connecting point
1517: endpoint
1518: endpoint
151a: grounding connector
151b: feeding connector
151c: first connector
151d: second connector
151e: third connector
151f: fourth connector
17: switch
171: first electrode
172: second electrode
17a: diode element
18: direct current blocking element
19: radio frequency blocking element

What is claimed is:

1. A handheld device, comprising:
a housing, having an outer surface and being configured to define a receiving space;
a circuit board, being disposed in the receiving space;
a planar antenna, comprising a metal layer, wherein the metal layer is patterned on the outer surface and comprises a first connecting point, a second connecting point, a third connecting point and a fourth connecting point; and
a switch, comprising a first electrode and a second electrode, wherein the first electrode and the second electrode are electrically connected between the first connecting point and the third connecting point of the metal layer and configured to control the electrical connection between the first connecting point and the third connecting point;
wherein the planar antenna operates in a first central frequency band when the switch is turned on, and operates in a second central frequency band when the switch is turned off; and
wherein the planar antenna further comprises a grounding connector, a feeding connector, a first connector and a second connector, the second connecting point is electrically connected to an RF signal terminal of the circuit board via the feeding connector, the fourth connecting point is electrically connected to a grounding terminal of the circuit board via the grounding connector, the first electrode is electrically connected to the first connecting point via the first connector, and the second electrode is electrically connected to the third connecting point via the second connector so that the first electrode and the second electrode are electrically connected between the first connecting point and the third connecting point of the metal layer.

2. The handheld device as claimed in claim 1, further comprising a DC blocking element and an RF blocking element disposed on the circuit board, wherein the DC blocking element is electrically connected between the first connecting point and the second connecting point via the first connector and the feeding connector, the switch is a diode element disposed on the circuit board, the second connecting point is further electrically connected to a DC signal terminal of the circuit board via the feeding connector and the RF blocking element to receive a DC signal, and the DC signal is configured to control an on/off state of the diode element.

* * * * *